United States Patent
Guccione

(10) Patent No.: US 7,899,445 B2
(45) Date of Patent: *Mar. 1, 2011

(54) MOBILE CONFERENCING AND AUDIO SHARING TECHNOLOGY

(75) Inventor: Darren Guccione, Wheaton, IL (US)

(73) Assignee: Callpod, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/785,267

(22) Filed: May 21, 2010

(65) Prior Publication Data

US 2010/0227597 A1 Sep. 9, 2010

Related U.S. Application Data

(63) Continuation of application No. 11/208,147, filed on Aug. 19, 2005, now Pat. No. 7,742,758.

(51) Int. Cl.
*H04M 3/42* (2006.01)
*H04M 1/00* (2006.01)
*H04W 4/00* (2009.01)
*H04B 7/00* (2006.01)
*H04B 1/00* (2006.01)
*H04B 1/20* (2006.01)
*H03G 5/00* (2006.01)

(52) U.S. Cl. .................. 455/416; 455/463; 455/518; 455/519; 455/569.1; 379/202.01; 381/119; 381/103; 369/4

(58) Field of Classification Search ............... 455/41.2, 455/518, 519, 462, 463, 416, 569.1; 379/202.01; 381/119, 103; 369/4
See application file for complete search history.

(56) References Cited

U.S. PATENT DOCUMENTS

D121,478 S 7/1940 Loewy
3,541,258 A 11/1970 Doyle et al.

(Continued)

FOREIGN PATENT DOCUMENTS

EP 0187696 7/1986

(Continued)

OTHER PUBLICATIONS

International Search Report issued in connection with PCT/US2005/044067 on Aug. 24, 2007.

(Continued)

*Primary Examiner*—Un C Cho
(74) *Attorney, Agent, or Firm*—Levenfeld Pearlstein, LLC

(57) ABSTRACT

A method and apparatus is provided for setting up a voice conference call or sharing audio content. The method includes the steps of providing an audio mixer that receives an audio input from each of at least three audio interfaces of the conference call, mixes the audio inputs and provides an equalized audio output to each of the at least three audio interfaces, providing a first local wireless interface between a first audio interface of the at least three audio interfaces and a first headset, providing a second local interface between a second audio interface of the at least three audio interfaces and a second headset and coupling a third audio interface of the at least three audio interfaces to a third headset through a base station of a cellular network, wherein the communication paths to the first, second and third persons are all different.

20 Claims, 2 Drawing Sheets

U.S. PATENT DOCUMENTS

| | | | |
|---|---|---|---|
| 3,601,904 A | 8/1971 | Elliot et al. |
| 4,160,122 A | 7/1979 | Jacobson |
| 4,229,829 A | 10/1980 | Grunwald |
| 4,567,332 A | 1/1986 | Jamison |
| 4,715,063 A | 12/1987 | Haddad et al. |
| 4,716,585 A | 12/1987 | Tompkins et al. |
| 4,882,745 A | 11/1989 | Silver |
| 4,972,457 A | 11/1990 | O'Sullivan |
| D327,886 S | 7/1992 | Yan |
| 5,133,002 A | 7/1992 | Kikuchi et al. |
| 5,210,791 A | 5/1993 | Krasik |
| 5,226,077 A | 7/1993 | Lynn et al. |
| 5,233,645 A | 8/1993 | Choi et al. |
| D340,455 S | 10/1993 | Christian |
| D350,735 S | 9/1994 | Karlin et al. |
| 5,359,647 A | 10/1994 | Regen et al. |
| D353,783 S | 12/1994 | Burns |
| 5,487,182 A | 1/1996 | Hansson |
| 5,488,657 A | 1/1996 | Lynn et al. |
| 5,504,812 A | 4/1996 | Vangarde |
| 5,528,666 A | 6/1996 | Weigand et al. |
| 5,557,653 A | 9/1996 | Paterson et al. |
| 5,590,417 A | 12/1996 | Rydbeck |
| 5,596,638 A | 1/1997 | Paterson et al. |
| 5,625,673 A | 4/1997 | Grewe et al. |
| RE35,536 E | 6/1997 | Irissou et al. |
| D387,758 S | 12/1997 | Oross et al. |
| D389,158 S | 1/1998 | Oross |
| D391,953 S | 3/1998 | Copeland et al. |
| 5,764,743 A | 6/1998 | Goedken et al. |
| 5,787,180 A | 7/1998 | Hall et al. |
| 5,797,089 A | 8/1998 | Nguyen |
| 5,812,683 A | 9/1998 | Parker et al. |
| 5,832,075 A | 11/1998 | Gancarcik |
| 5,844,824 A | 12/1998 | Newman et al. |
| 5,890,074 A | 3/1999 | Rydbeck et al. |
| D410,228 S | 5/1999 | Jones |
| 5,909,432 A | 6/1999 | Arends et al. |
| D412,501 S | 8/1999 | Tyneski et al. |
| 5,951,317 A | 9/1999 | Tracy et al. |
| D415,131 S | 10/1999 | Chang |
| 5,978,689 A | 11/1999 | Tuoriniemi et al. |
| 5,982,879 A | 11/1999 | Lucey |
| 5,983,100 A | 11/1999 | Johansson et al. |
| 5,991,398 A | 11/1999 | Lipton et al. |
| D417,465 S | 12/1999 | Kreitz et al. |
| 6,026,082 A | 2/2000 | Astrin |
| 6,029,072 A | 2/2000 | Barber |
| D425,484 S | 5/2000 | Ahlgren |
| 6,078,825 A | 6/2000 | Hahn et al. |
| D430,052 S | 8/2000 | Nowak |
| 6,130,602 A | 10/2000 | O'Toole et al. |
| 6,144,848 A | 11/2000 | Walsh et al. |
| D438,856 S | 3/2001 | Uehara |
| D444,779 S | 7/2001 | Hin |
| D446,207 S | 8/2001 | Matthes et al. |
| 6,321,080 B1 | 11/2001 | Diethorn |
| D452,684 S | 1/2002 | Sedan et al. |
| D453,154 S | 1/2002 | Astradsson |
| D454,556 S | 3/2002 | Schmidt et al. |
| 6,405,027 B1 | 6/2002 | Bell |
| 6,434,402 B1 | 8/2002 | Davison et al. |
| 6,470,197 B1 | 10/2002 | Tuoriniemi et al. |
| 6,594,366 B1 | 7/2003 | Adams |
| 6,615,059 B1 | 9/2003 | Pehrsson et al. |
| 6,650,871 B1 | 11/2003 | Cannon et al. |
| 7,254,123 B2 | 8/2007 | Jukarainen |
| 7,742,758 B2 * | 6/2010 | Guccione ............... 455/416 |
| 2003/0002644 A1 | 1/2003 | Guccione et al. |
| 2004/0086093 A1 | 5/2004 | Schranz |
| 2004/0116130 A1 | 6/2004 | Seligmann |
| 2004/0266443 A1 | 12/2004 | Ito |
| 2005/0122389 A1 | 6/2005 | Miao |
| 2005/0233778 A1 | 10/2005 | Rodman et al. |
| 2006/0251115 A1 | 11/2006 | Haque et al. |
| 2007/0186002 A1 | 8/2007 | Campbell et al. |
| 2007/0260682 A1 | 11/2007 | Guccione |
| 2007/0294263 A1 | 12/2007 | Punj et al. |

FOREIGN PATENT DOCUMENTS

| | | |
|---|---|---|
| EP | 533935 | 3/1993 |
| FR | 2223915 | 10/1974 |
| JP | 6237483 | 8/1994 |
| JP | 10136100 | 5/1998 |
| JP | 10210162 | 8/1998 |
| JP | 11355450 | 12/1999 |
| JP | 2003140985 | 5/2003 |
| WO | 0143351 | 6/2001 |
| WO | 2007024250 | 3/2007 |

OTHER PUBLICATIONS

International Preliminary Report on Patentability issued in connection with PCT/US2005/044067 on Feb. 20, 2008.

European Search Report issued in connection with EP05257751.7 on Apr. 24, 2005.

International Search Report issued in connection with PCT/US2007/068054 on Jun. 20, 2008.

International Preliminary Report on Patentability issued in connection with PCT/US2007/068054 on Nov. 4, 2008.

\* cited by examiner

MOBILE CONFERENCING AND AUDIO SHARING TECHNOLOGY

CROSS REFERENCE TO RELATED APPLICATIONS

The present application is a continuation of U.S. patent application Ser. No. 11/208,147 filed on Aug. 19, 2005 titled "Mobile Conferencing and Audio Sharing Technology."

FIELD OF THE INVENTION

The field of the invention relates to communication systems, voice conferencing and audio sharing features among a number of participants in mobile environments.

BACKGROUND OF THE INVENTION

Conference calls have become an essential part of business worldwide. Many companies operate on a national or multi-national level. Where operations must be coordinated, then the need for conference calls between far-flung offices becomes obvious.

Typically one or more sides to the call gather in a conference room and place a call to the other side. Typically a conference phone is placed in the center of a table surrounded by conference participants.

Conference phones are typically provided with microphones/speakers on two or more sides and a volume control. Conference phones tend to operate in only one direction at a time because of feedback. In most cases, if a conference phone is receiving a voice signal from a far end, it disables a local microphone. If a speaker should pause or finish speaking, then the microphones on both ends may be activated. In this case, the first side to begin speaking would gain control of the channel.

While conference phones work relatively well, they suffer from a number of deficiencies. In addition to the difficulty caused by both sides speaking at the same time, not all participants around a conference table can hear or be heard, especially if the party is not directly in front of the speaker.

In order to solve the problems associated with distance, U.S. Pat. No. 6,801,611 to Guccione et al. describes a hand-held conferencing device into which participants may plug headsets. A remote party may be joined to the conference via a cellular telephone or personal communications device.

While Guccione et al. is an improvement over prior devices, it still fails to offer participants the mobility needed. For example, conference calls may often be required at inconvenient times and in inconvenient places. The need to carry an extra hand-held conferencing device is inconvenient and unnecessary. Accordingly, a need exists for conferencing features that are more convenient and that do not require any special equipment.

SUMMARY

A method and apparatus is provided for setting up a conference call or mobile audio sharing situation. The method in respect to voice conferencing includes the steps of providing an audio mixer that receives an audio input from each of at least three audio interfaces of the conference call, mixes the audio inputs and provides an equalized audio output to each of the at least three audio interfaces, providing a first local wireless interface between a first audio interface of the at least three audio interfaces and a wireless headset of a first person of the conference call, providing a second local interface between a second audio interface of the at least three audio interfaces and a second person of the conference call and coupling a third audio interface of the at least three audio interfaces to a third party of the conference call through a base station of a cellular network, wherein the communication paths to the first, second and third persons are all different. The method in respect to sharing audio and video content is similar to voice conferencing, except the communication path between the audio interface and person is in one direction (i.e. no voice path), and if stereo audio is required the audio information is split into a left-ear and right-ear channel.

DETAILED DESCRIPTION OF AN ILLUSTRATED EMBODIMENT

Figure 1:
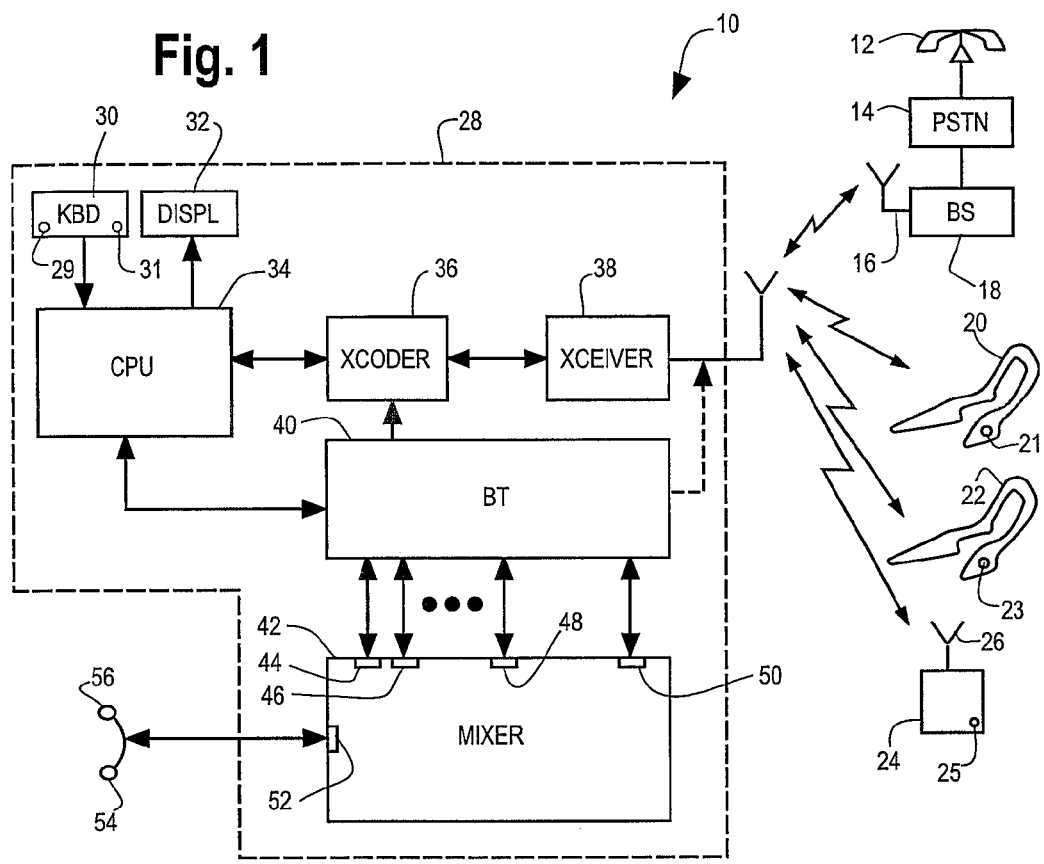
FIG. 1 is a block diagram of a conferencing phone system in accordance with an illustrated embodiment of the invention.

FIG. 1 is a block diagram of a cellular telephone (cellphone) conferencing system 10 shown generally in accordance with illustrated embodiments of the invention. Shown in FIG. 1 is a cellphone 28 that may function to set up conference calls and also conventionally in the cellular context. In this regard, the cellphone 28 may place or receive calls with a second party 12 through the cellular base station 18. In addition, a user (not shown) of the cellphone 28 may also set up conference calls among devices 12, 20, 22, 24, 28 where a communication path with devices 20, 22, 24 is provided through local wireless interfaces. As used herein, a local wireless interface means a wireless interface between local mobile transceivers. It does not involve the cellphone-to-base station features of the cellular network.

Included within the conferencing cellphone 28 may be a central processing unit (CPU) 34 with a keyboard 30 and display 32. Included within the CPU 34 may be one or more software routines that provide a graphical user interface (GUI) on the display 32 for controlling conference calls.

Also included within the conferencing cellphone 28 may be a transcoder 36 and transceiver 38. The transcoder 36 and transceiver 38 may operate under control of the CPU 34 to place and receive cellular calls through the cellular base station 18. In addition, the transcoder 36 may function to transcode set up and conferencing information between a BT controller 40 and conferenced devices (headsets) 20, 22, 24. Alternatively, the Bluetooth (BT) controller 40 may merely share an antenna with and operate independently of the transcoder 36 and transceiver 38.

For purposes of illustration and not limitation, devices 20, 22 may be any wireless headset (e.g., the Jabra Model BT800). The wireless headset 26 may be any Bluetooth enabled cellphone.

Under a first illustrated embodiment, the conferencing feature is provided and controlled through the GUI provided from within the cellphone 28. Under the first embodiment, one or more communication devices 20, 22, 24, 26 may be combined by the conferencing cellphone 28 into a network (e.g., a piconet) under an appropriate communication protocol (e.g., Bluetooth, IEEE 802.11, any other future protocol which can support communication with two audio channels, etc.). Within the piconet, the cellphone 28 may function as a master and the wireless headsets 20, 22 and/or cellphone 26 may function as slaves. It should be understood that while only three slave devices 20, 22, 24 are shown in FIG. 1, the conferencing system 10 is scalable to support any number of slave devices, the limiting factor is the communication protocol, e.g. Bluetooth which could support up to seven slave devices 20, 22, 24.

The conferencing cellphone 28 may operate under a dual-power, dual-frequency format. For example, the cellphone 28 may operate at a power of up to 3 watts when communicating with the base station 18 and at a power level of only about 1 milliwatt when communicating within the piconet.

The cellphone 28 may use a first frequency spectrum (i.e., conventional cellphone channels) for communicating with the base station 18 and channels within a second frequency spectrum (e.g., 2,400 to 2,483.5 MHz, 2,472 to 2,497 MHz, etc.) for communications within the piconet.

The conference cellphone 28 may operate within the piconet using a frequency hopping format (e.g., Bluetooth). The information transfer rate within the piconet between the conferencing cellphone 28 and slaves 20, 22, 24 may be 1 megabit per second (Mbps) using Bluetooth 1.0 or 1.1, or up to 3 Mbps using Bluetooth 2.0. The bandwidth may be further increased by the use of an alternate communication technology.

Frequency hopping may occur pseudorandomly at a rate of 1600 channels per second among a predetermined channel set (e.g., 23 RF channels, 79 RF channels, etc.). The time slot on each channel may be 625 microseconds long.

Packets within the piconet may be up to five slots long. Data within a packet may be up to 2,745 bits in length.

Communication between the master 28 and slaves 20, 22, 24 may occur under a synchronous connection oriented (SCO) format or an asynchronous connectionless (ACL) format. Using SCO, communications between master and slaves may be on reserved channels.

In the case where ACL is used, outbound information (i.e., from master to slave) may be broadcast from the master to all slaves or point-to-point (i.e., from the master to one slave at a time). ACL slaves can only transmit when requested by the master.

As used herein, a channel (communication path) within a piconet means a duplex channel. As such, a channel includes both inbound and outbound paths. Since the slave units 20, 22, 24 all transmit one-at-a-time under control of the master, the channels between the master and respective slaves are all different.

Set up of a piconet channel for a slave unit may be accomplished in any of a number of different ways. Under one embodiment, set up between the cellphone 28 and headsets 20, 22 may occur through a known process referred to as pairing. Set up of the channel between the conferencing cellphone 28 and slave cellphone 24 may occur using a similar process.

Turning now to the conferencing system 10, a cellphone controller 34 and BT controller 40 within the conferencing cellphone 28 may be used to set up and control conferencing. Pairing may be accomplished for a first device 20, by activating a pairing button 21 on the device 20 while at the same time activating a pairing button 31 displayed on the GUI of the conferencing cellphone 28. In response, the cellphone 28 transmits a piconet polling packet, including an identifier of the cellphone 28, to any nearby devices. Since the pairing button 21 on the device 20 is activated, the device 20 may transmit a response identifying the type of device 20 involved. The cellphone 28 may receive and analyze the packet to identify the device. Once the device 20 has been identified, the cellphone 28 may assign a unique address to the device 20 consistent with the type of device involved. The pairing process may be repeated with each of the other devices 22, 24.

Once the slave devices 20, 22, 24 have been paired with the conferencing cellphone 28, conference calls may be set up by activating the devices 20, 22, 24 and selecting a conference button 29 on the GUI of the conference cellphone 28. Upon activating the conference button 29, the BT controller may open a wireless channel between an audio interface 44, 46, 48, 50, 52 of a mixer 42 and a respective slave device 20, 22, 24 under either the SCO or ACL format. For example, the first device 20 may be assigned to the first audio interface 44, the second device 22 may be assigned to the second audio interface 46 and the third device 24 may be assigned to a third audio interface 48.

Figure 2:
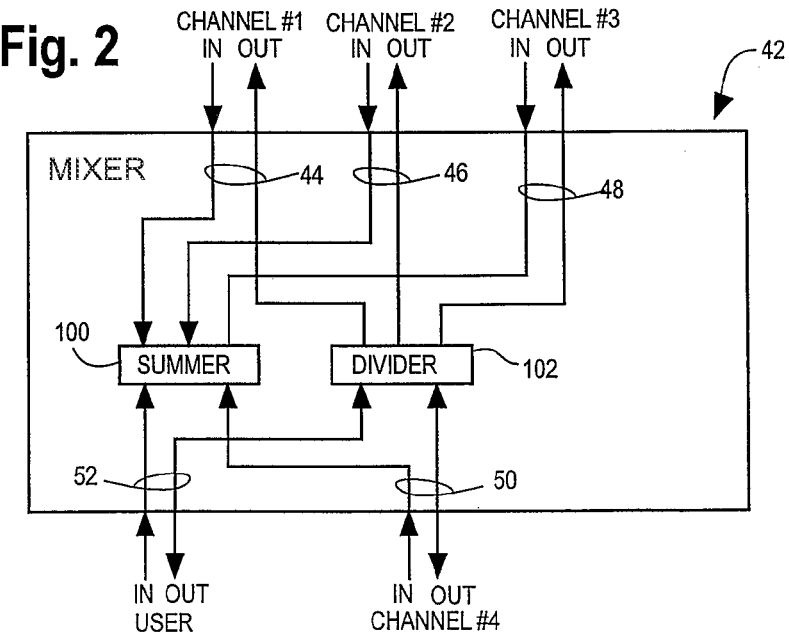
FIG. 2 is a block diagram of a mixer of the phone system of FIG. 1.

FIG. 2 shows a block diagram of the mixer 42. As shown in FIG. 2, each audio interface includes an audio input and an audio output.

Within the mixer 42, the audio signals are mixed and an equalized output provided to each participant. As used herein, mixing means summing an audio input from a number of audio interfaces, dividing the sum by the number of audio interfaces and providing an equalized audio output to each of the number of audio interfaces.

As opposed to prior art audio conferencing systems, the audio conferencing system 10 operates in a full duplex mode. In this regard, each participant of the conference call communicates with the mixer 42 over an independent communication channel that is not shared with any other participant.

As shown in FIG. 2, the audio input of each device 20, 22, 24 is summed in a summer 100. Following summation of the audio inputs from each participant to the conference call, the summation of inputs is provided as an input to the divider 102 where the summation is divided by the total number of participants. The dividend is then distributed through a respective audio interface to each participant of the conference call as an audio output.

In addition to the devices 20, 22, 24, the user of the cellphone 28 may also participate in the conversation. In this regard, a microphone 54 and earphone 56 of the cellphone 28 may be coupled to a respective audio interface 52 of the mixer 42. As above, a signal from the microphone 54 may be added to the inputs from each of the other devices 20, 22, 24, divided by the number of participants and distributed on the audio output to the earphone 56.

The user of the cellphone 28 may also add other groups to the conference call by placing an outbound call to (or receiving an inbound call from) other parties. The conference call with the other parties could be based upon use of another cellphone 28, a conventional speakerphone or a plain old telephone service (POTS) telephone. In any case, once the call is placed (or received), a CPU 34 may instruct the transcoder 36 and BT controller 40 to connect the other parties to the mixer 42 through a fifth audio interface. As above, an input from the other parties may be summed and divided by the number of parties to the conference call and distributed to the parties through the respective audio outputs of the mixer 42.

Figure 3:
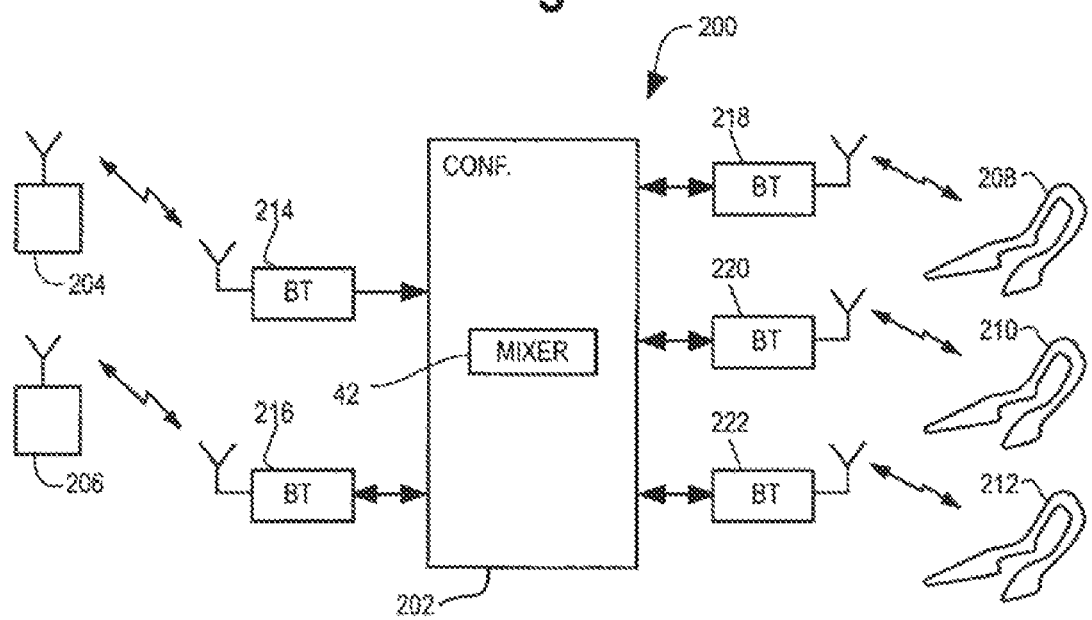
FIG. 3 is a block diagram of the phone system of FIG. 1 under an alternate embodiment.

In another, alternate embodiment, the conferencing system 10 (now labeled 200 in FIG. 3) is located in and controlled from a conferencing module 202. In the alternate embodiment, the audio interfaces are provided in the form of 2.5 mm plugs on the module 202. The individual channels to mobile devices 208, 210, 212 may be set up and maintained via the use of conventional Bluetooth interface devices (e.g., the model BT800 wireless headset provided by Jabra). Control of the cellular telephone 204, 206 for joining other parties to the conference call may be accomplished remotely via the use of a Bluetooth headset controller 214, 216 (e.g., the model BT230 available through Southern Telecom).

Outbound calls may be made by activating the St button on the headset controller 214, 216. Once the St button is activated, a user may use voice dialing to connect to another party through the cellular base station 18.

A voice signal from the other party may be coupled through the audio interface into the conferencing system 200 through the controller 214, 216. Within the conferencing system 200, the voices of each participant received through the respective audio interfaces are mixed in a mixer 42 and distributed to the respective party.

To end the call, a user may activate the S2 button for three seconds. To answer an incoming call, the user may activate the S1 button. Once answered, the user may conference in other parties by simply activating the conferencing unit 200.

Under another illustrated embodiment, the conferencing feature may be configured as shown in FIG. 1 and disposed within a personal digital assistant (PDA). Under this embodiment, a headset 54, 56 may be separately connected to the PDA through use of a 1 mm or 2.5 mm connector plug or wirelessly over Bluetooth or another wireless communication protocol.

Under still another illustrated embodiment, the conferencing feature may be configured as shown in FIG. 1 and disposed within a notebook computer. Under this embodiment, a headset 54, 56 may be separately connected to the computer through use of a 1 mm or 2.5 mm connector plug or wirelessly over Bluetooth or another wireless communication protocol.

Under another illustrated embodiment, audio or audio and video may be shared among participants. In this regard, the audio and video may be received by the cellphone. The video may be displayed on the display 32. Audio may be distributed to the units within the piconet. Where audio and video is shared, the channel between the cellphone 28 and devices 20, 22, 24 may predominately be used as a one-way channel. Alternatively, the devices 20, 22, 24 may be provided with a separate earphone for each ear and the duplex channel divided into a left ear side and a right ear side for each device 20, 22, 24.

A specific embodiment of a method and apparatus for providing conference calls has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A conferencing system for conducting a conference call, the conferencing system comprising:
    an audio mixer configured to receive an audio input from each of at least three audio interfaces of the conference call, mix the audio inputs, and provide an equalized audio output to each of the at least three audio interfaces;
    a first local wireless interface between a first audio interface of the at least three audio interfaces and a first communication device;
    a second local interface between a second audio interface of the at least three audio interfaces and a second communication device; and
    a third audio interface of the at least three audio interfaces capable of coupling to a third communication device through a phone network,
    wherein the first local wireless interface, the second local interface and the third audio interface are independent of each other and provide full duplex communications, and
    wherein the audio mixer comprises a summer and a divider, the summer configured to sum the audio inputs from each of the at least three audio interfaces and to provide the sum to the divider, the divider configured to divide the sum equally across the at least three audio interfaces to provide the equalized audio output.

2. The conferencing system of claim 1, wherein the conferencing system is communicatively connected to a cellphone.

3. The conferencing system of claim 2, wherein the conferencing system is disposed within a cellphone.

4. The conferencing system of claim 1, wherein the conferencing system is disposed within a personal digital assistant (PDA).

5. The conferencing system of claim 1, wherein the conferencing system is disposed within a notebook computer.

6. The conferencing system of claim 1, wherein the conferencing system is disposed within a conferencing module.

7. The conferencing system of claim 1, wherein the phone network comprises a cellular phone network.

8. The conferencing system of claim 1, wherein the phone network comprises a public switched telephone network (PSTN).

9. The conferencing system of claim 1, wherein at least one of the first communication device or the second communication device comprises a wireless headset, and wherein at least one of the first communication device or the second communication device comprises a cellphone.

10. The conferencing system of claim 1, wherein the second local interface comprises a wireless interface.

11. The conferencing system of claim 1, wherein the first local wireless interface operates using a Bluetooth protocol.

12. The conferencing system of claim 1, wherein the first local wireless interface operates using a non-Bluetooth protocol.

13. The conferencing system of claim 10, wherein the second local interface operates using a Bluetooth protocol.

14. The conferencing system of claim 10, wherein the second local interface operates using a non-Bluetooth protocol.

15. The conferencing system of claim 1, wherein the conferencing system is disposed within an electronic device with audio capabilities.

16. The conferencing system of claim 1, wherein the first communication device comprises a wireless headset, the second local interface comprises a wireless interface, and the second communication device comprises a wireless headset.

17. The conferencing system of claim 16, wherein the phone network comprises a cellular phone network.

18. The conferencing system of claim 16, wherein the phone network comprises a public switched telephone network (PSTN).

19. The conferencing system of claim 16, wherein the third audio interface is communicatively connected to a cellphone.

20. A method of setting up a conference call, the method comprising:
    providing an audio mixer configured to receive an audio input from each of at least three audio interfaces of the conference call, mix the audio inputs, and provide an equalized audio output to each of the at least three audio interfaces;

providing a first local wireless interface between a first audio interface of the at least three audio interfaces and a first communication device;

providing a second local interface between a second audio interface of the at least three audio interfaces and a second communication device; and providing a third audio interface of the at least three audio interfaces capable of coupling to a third communication device through a phone network, wherein the first local wireless interface, the second local interface and the third audio interface are independent of each other and provide full duplex communications, and wherein the audio mixer comprises a summer and a divider, the summer configured to sum the audio inputs from each of the at least three audio interfaces and to provide the sum to the divider, the divider configured to divide the sum equally across the at least three audio interfaces to provide the equalized audio output.

\* \* \* \* \*